Aug. 29, 1939.    D. C. ROCKOLA ET AL    2,171,345
PARKING METER
Filed March 27, 1936    4 Sheets-Sheet 1

Inventors.
David C. Rockola
Alfred Vischer Jr.
By Williams, Bradbury,
McCaleb & Hinkle, Attys.

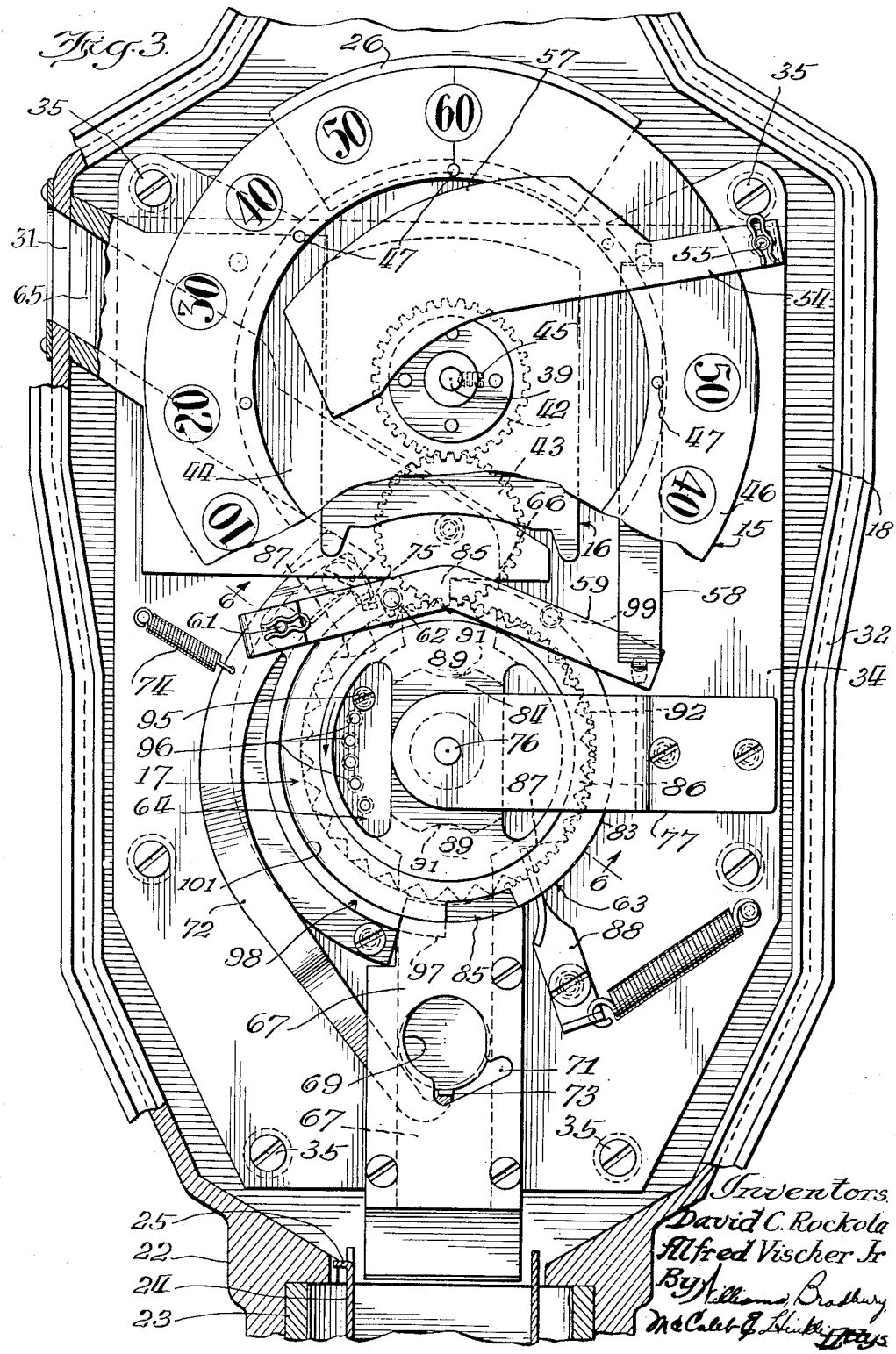

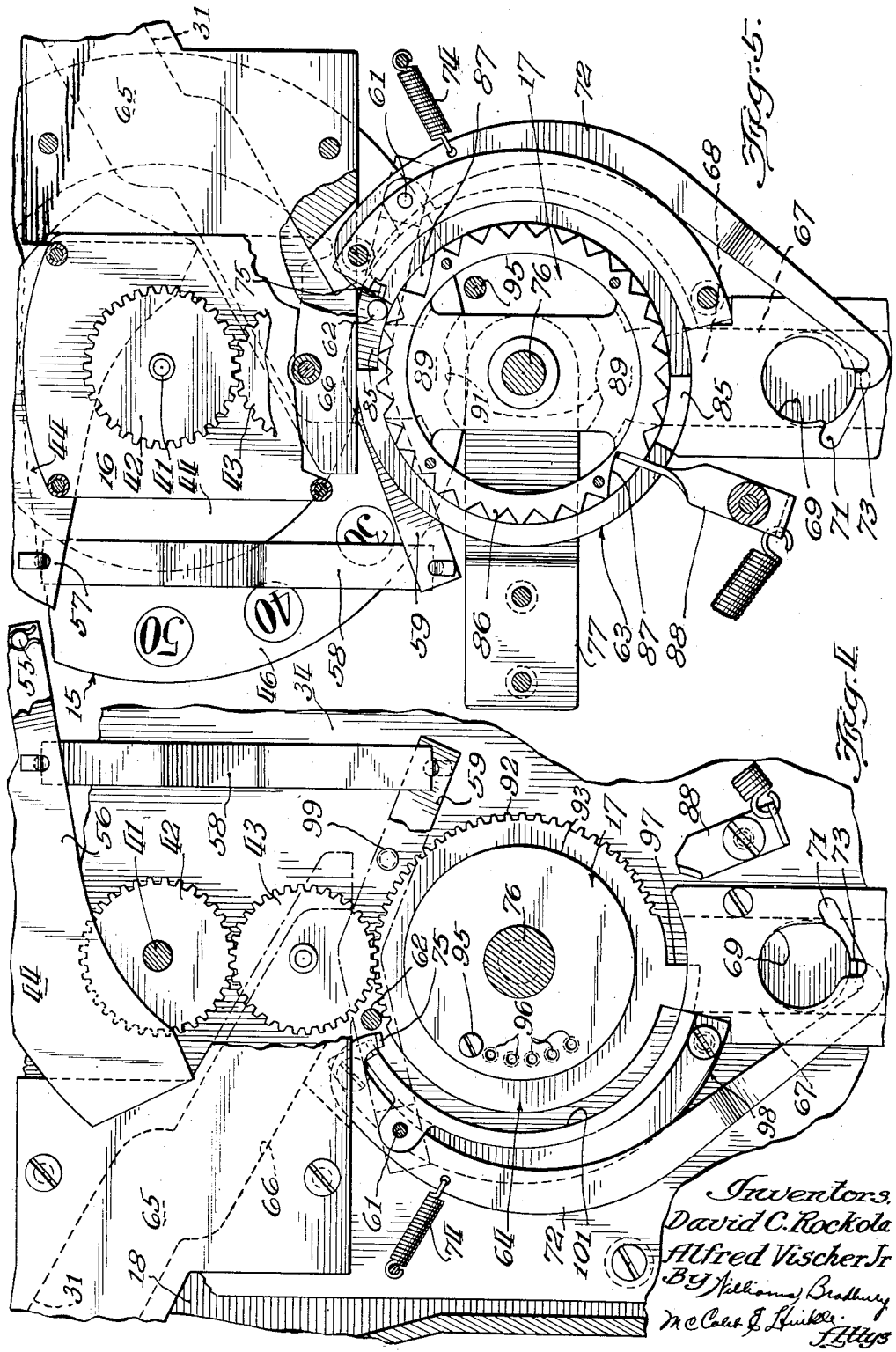

Aug. 29, 1939.  D. C. ROCKOLA ET AL  2,171,345
PARKING METER
Filed March 27, 1936  4 Sheets-Sheet 4
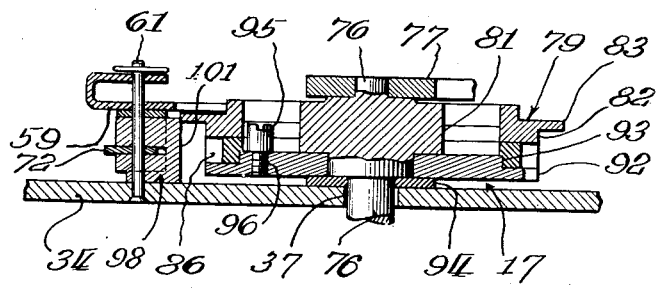
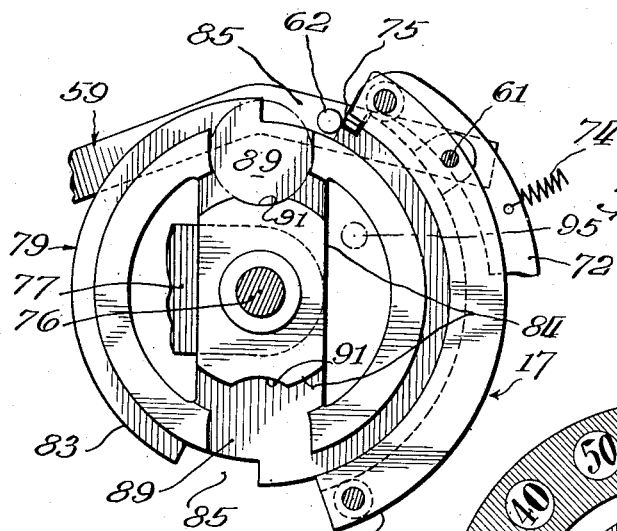
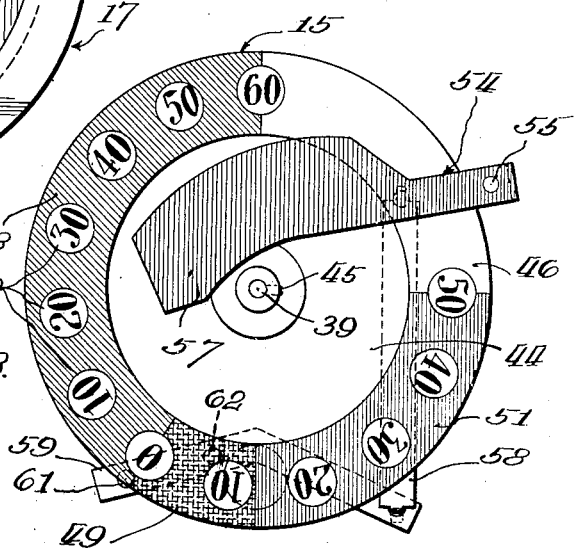
Inventors.
David C. Rockola
Alfred Vischer Jr.
By Williams, Bradbury, McCaleb & Hinkle
Attys.

Patented Aug. 29, 1939

2,171,345

UNITED STATES PATENT OFFICE 2,171,345

PARKING METER

David C. Rockola, Chicago, and Alfred Vischer, Jr., Park Ridge, Ill.; said Vischer, assignor to said Rockola Application March 27, 1936, Serial No. 71,088

10 Claims. (Cl. 194—61)

This invention relates to parking meters.

The parking of vehicles on streets or in other places is frequently, if not quite generally, limited by ordinances or other controlling regulations to periods of time which may vary in accordance with desired or prevailing traffic conditions. On some streets, for example, one-hour parking is permissible, and on others the parking period may be more or less than an hour. One purpose of such regulations is to permit a greater number of parkings per day in a given district or area or in the available parking spaces. The parking meter of the invention is adapted to indicate the availability of a parking space for an automobile or other vehicle; upon actuation, to set, energize, and start timing means for indicating the permissible time interval for or period of parking and, during the parking period, for indicating the time remaining in the parking period; and to indicate when the parking period has expired. In that manner the invention may be employed to facilitate enforcement of parking regulations.

A primary object of the invention is the provision of a novel parking meter.

Important objects of the invention include the provision of such a parking meter of simple and fool-proof construction, which may be readily installed and operated to indicate and time a desired parking period and which is adjustable to adjust the timed parking period; which includes a parking period indicator, a grace period indicator, and an overtime indicator; which conceals the indicator means from view during the setting thereof; which during the timing operation reveals the time indicia at opposite sides of the casing; which employs coin controlled clock winding means that is automatically reset during the indicating period; which sets the indicator means from the clock winding means; and which employs a self-starting clock for driving the indicator means in accordance with the time indicia thereon.

Other objects of the invention include the combinations and arrangements of parts as hereinafter described in connection with the accompanying drawings and as more particularly set forth in the claims.

In the drawings:

Fig. 1 is an elevational view of a parking meter embodying the features of the invention;

Fig. 2 is a fragmentary, vertical cross-section of the meter shown in Fig. 1 on a different scale;

Fig. 3 is a rear elevational view of the parking meter shown in Fig. 2, with the casing open and with parts broken away to bring out certain details of assembly and construction;

Fig. 4 is a cross-section taken substantially along the lines 4—4 of Fig. 2;

Fig. 5 is a cross-section taken substantially along the lines 5—5 of Fig. 2;

Fig. 6 is a cross-section taken substantially along the lines 6—6 of Fig. 3;

Fig. 7 is a fragmentary sectional detail of the token or coin controlled device; and Fig. 8 is an elevational view of the indicator means.

Illustrative of the invention, the novel parking meter comprises time indicator means 15, clock means 16 for driving the indicator means in accordance with the time indicated thereby, and token or coin controlled means 17 for operating the foregoing means to condition the same for indicating the passing of predetermined periods of time. Such means are operatively carried in a suitable casing including a front relatively stationary casing member 18 and a rear casing member 19 pivoted or hinged as at 21 to the front casing member. The casing may be provided with a depending boss 22 at its lower end, which is apertured to receiver therein the upper end of a suitable standard 23, preferably of hollow construction, for supporting the casing at a convenient height. The hollow standard 23 facilitates the mounting of a token or coin receptacle 24 with its open end communicating with the interior of the casing, and the receptacle extends through an aperture 25 in the lower wall of the casing into the hollow standard 23, as shown in Fig. 2.

The casing is further provided with a pair of aligned sight windows 26 and 27 in the front and rear casing members, respectively, for rendering the indicator means 15 visible from opposite sides of the casing; with a pair of aligned sight windows 28 and 29 in the front and rear casing members, respectively, below the sight windows 26 and 27 for exposing to view from opposite sides of the casing, the last token or coin employed in operating the parking meter; and with a token or coin receiving slot or aperture 31 in the front casing member for receiving the token or coins employed in controlling the operation of the parking meter of the invention. Suitable means 32 are provided at the meeting edges of the casing members for protecting the apparatus in the casing from the weather, and a key operable lock 33 at the upper end of the casing is employed for securing the rear casing member in closed position.

In order to permit replacements and repairs, a mounting plate or panel 34 is removably mounted as at 35 in the front casing member 18 and serves to carry the indicator means and the operating and control means therefor as a unitary assembly which is removable and replaceable by another such assembly while the first mentioned assembly is being inspected, repaired, or othewise serviced. The plate 34 extends from below the sight window 26 to the region of the sight window 28 and has an aperture 36 therein alinged with the sight window 28 and a shaft aperture 37 aligned with a shaft aperture 38 in and about centrally of the front casing wall.

The clock means 16 is suitably secured and spaced from the mounting plate 34 at about the center of the upper end thereof and may be of any usual or preferred type. Preferably, however, a self-starting clock is employed which has a timer shaft 39 extending rearwardly from one side of the clock means 16, and an energizing or winding stem 41 extending forwardly from the other side of the clock means. The winding stem 41 has fixed thereon a gear 42 meshing with a gear 43 rotatably secured to the rear face of the mounting plate 34, as shown in Fig. 2, for winding or energizing the clock means 16 to cause it to rotate the timer shaft 39. In the illustrated clock, the timer shaft 39 and the winding stem 41 rotate together.

For the indicator means 15, we employ a disc 44 of, for example, sheet metal, fixed as at 45 to rotate with the timer shaft 39 and carrying a circumscribing ring 46 of transparent or at least translucent material, such as Celluloid, and of sufficient width to extend from the periphery of the disc 44 to a position between the sight windows 26 and 27. The transparent ring 46 is secured as at 47 to the disc 44 for rotation therewith and is adapted to provide a parking period indicator 48, a grace period indicator 49, and an overtime indicator 51 by dividing the ring into portions which may have different colors or may be otherwise differentiated to designate the respective periods already mentioned.

Each of those portions of the ring 46 is calibrated in minutes or other time units in such a manner that the time indicia are visible from the front and rear of the parking meter through the sight windows 26 and 27. For example, at spaced intervals about the ring corresponding to ten minutes, the transparent ring may be opaqued with ink or other coloring as at 52, and the time indicia printed or otherwise inscribed thereon at both sides of the ring. During the operation of the indicator means 15 by the clock means 16, suitable stationary pointer means 53 cooperates with the time indicia to indicate elapsed time.

Associated with the indicator means 15 is a shutter member 54 which is pivoted on the rear end of a stud 55 projecting rearwardly from the mounting plate 34 at an end of the sight window 26, and which has a shutter portion 56 forwardly of the indicator means 15 and a shutter portion 57 rearwardly of the indicator means. The shutter member 54 is swingable about its pivot to and from a position between the sight windows 26 and 27 for concealing and revealing the time indicia from opposite sides of the casing.

For operating the shutter member 54, we employ link means including a link or an arm 58 pivotally connected at one end to an end of a link or arm 59 which is pivoted at its other end to a stud 61 projecting rearwardly from the mounting plate 34 above and at a side of the aperture 37. The arm or link 59 has intermediate its ends an operating pin 62 operable from the token or coin controlled means 17 for raising, and holding in raised position, the shutter member 54 while the parking meter is being set, and for lowering the shutter member when the parking meter is set for operation. The shutter member is preferably painted the color of the overtime indicator 51 to remind a user of the parking meter not to leave the parking meter until it is properly set.

In order that the cost of supervising parking regulations may be borne only by the users of the supervisory service, the token or coin controlled means 17 is employed for driving the gear 43 to rotate the gear 42 and hence the winding stem 41, thus rotating the timer shaft 39 to set the indicator means 15 at a position indicating the beginning of the parking period. In so rotating the winding stem 41, the clock 16 is energized or wound for driving the indicator means in accordance with the time indicia thereon. Such token or coin control means, generally considered, comprises an interrupted token or coin slide for delivering tokens or coins from the aperture 31 to an operative position and for delivering each token or coin, after it has served its control function, to the token or coin receptacle 24; a token or coin transferring device 63 (Fig. 5) for actuating the controlling token or coin during the clock energizing operation; and adjustable means 64 (Fig. 4) driven from the transferring device 63 for driving the gear 43.

The interrupted token or coin slide may be of any suitable construction and includes a receiving guideway 65 which is carried on the rear face of the mounting plate 34, and which communicates at one end with the aperture 31 and extends therefrom, at a generally downward inclination, to a position above the token or coin transferring device 63 where the guideway 65 is provided with an outlet port 66. A depositing guideway 67 is carried on the rear face of the mounting plate 34 and has an inlet port 68 spaced vertically from the port 66 of the receiving guideway and at the opposite side of the transferring device, and communicates at its lower end with the receptacle 24.

For discouraging the use of counterfeit or spurious tokens or coins, the depositing guideway 67 is provided with aligned apertures 69 in its front and rear walls, and those apertures 69 are aligned with the sight windows 28 and 29 and the aperture 36. At their lower sides the apertures 69 respectively communicate with generally rectangular apertures 71 in the front and rear walls of the guideway 67 for cooperating with a token or coin trip device or lever 72. The lever 72 is pivoted intermediate its ends on the stud 61 and is of curved configuration with a finger 73 at its lower end extending into the depositing guideway 67 through one of the apertures 71 for holding or retaining a token or coin in view at the apertures 69 until the next token or coin is employed to control the parking meter. The lever 72 is yieldably held in its retaining position by a spring 74 and has at its end opposite the finger 73 a cam finger 75 operably engageable by a token or coin being transferred by the transferring device 63 for releasing the token or coin previously deposited, and held between the apertures 69 to permit that token or coin to fall into the receptacle 24.

The token or coin transferring device 63 comprises a shaft or shank 76 which is journaled at its inner end in an offset arm of a bracket 77 secured as shown in Fig. 3 to the mounting plate 34, and which passes through the apertures 37 and 38 to outside the casing. Outside of the casing, the shaft 76 is provided with a handle 78 to facilitate rotating the shaft. Forwardly of the supporting arm of the bracket 77, the shaft 76 carries a wheel-like member 79 (Figs. 6 and 7) rotatable therewith and having a hub 81, a shouldered cylindrical wall 82 spaced outwardly from and coaxially about the hub 81 and provided with an outwardly extending peripheral flange 83, and a pair of oppositely extending, flat spokes 84 connecting the hub 81 and the cylindrical wall 82.

As shown in Fig. 7, the peripheral flange 83 is provided with a pair of diametrically opposite control slots 85 for receiving therein the operating pin 62 of the shutter member 54. When the pin 62 is in either of the slots 85 the shutter member is down below the sight windows 26 and 27 and the wheel-like member 79 is locked against rotation. When, however, pin 62 is raised to clear the flange 83, the shutter member 54 is raised to conceal the time indicia on the indicator means 15 and the wheel-like member 79 may be rotated a half revolution until the pin 62 drops into the other slot 85. During that half-revolution of the wheel-like member, the flange 83 serves to hold the pin 62 in the position for keeping the shutter member 54 in the raised position to indicate that the parking meter is not properly set.

The forward end of the cylindrical wall 82 carries a ring-like ratchet 86 having diametrically opposite positioning teeth or notches 87 cooperating with a spring-urged pawl 88 for positioning the wheel-like member 79 with respect to the pin 62. By reference to Fig. 3, it will be seen that the pin 62 is normally at the end of the slot 85 leading with respect to the direction of rotation of the wheel-like member, and is resiliently held in that position by the spring-urged pawl 88. The pin therefore prevents backward rotation of the wheel-like member. If while the pin 62 is in one of the slots 85, rotation of the wheel-like member is attempted in the direction of the arrow in Fig. 3, the lagging end of the slot 85 is brought against the pin 62, and such rotation is stopped, the spring-urged pawl 88 returning the wheel-like member to the position shown in Fig. 3.

In that position of the wheel-like member 79, the oppositely extending, flat spokes 84 thereof are substantially vertical, and are aligned with and between the outlet port 66 of the receiving guideway 65 and the inlet port 68 of the depositing guideway 67. The cylindrical wall 82 between the forward face of the flange 83 and rearwardly of the ring-like ratchet 86 is provided with a pair of diametrically opposite slots 89 which are normally aligned with the ports 66 and 68, respectively, outwardly thereof and with diametrically opposite recesses 91 in the hub 81 adjacent and centrally of the spokes 84. The dimensions of the wheel-like member 79 are such that if the proper token or coin is inserted in either of the slots 89 and the corresponding recess 91, the periphery at one side of the token or coin will engage in the recess 91 and the token or coin will extend outwardly therefrom along the spoke 84 and through the slot 89 between the flange 83 and the ratchet 86. Outwardly of the slot 89 the token or coin rests against the outer face of the flange 83.

Forwardly of the wheel-like member 79, the shaft 76 has loosely mounted thereon the adjustable means 64 which comprises a segmental gear 92 meshing with the gear 43 and having a hub portion 93 extending rearwardly therefrom into the ring-like ratchet 86. That segmental gear may be spaced along the shaft 77 rearwardly from the mounting plate 34 by a suitable spacer or washer 94 and is adapted to be driven from the wheel-like member 79 by a pin or other projection 95 receivable in any of a plurality of pin receiving sockets 96 spaced arcuately about the shaft 76 and in the rear face of the hub portion 93. That pin 95 extends from the hub portion 93 rearwardly between the hub 81 and the inner surface of the cylindrical wall 82 into the path of a token or coin carried by the wheel-like member 79 during the transfer of a token or coin to the depositing guideway 67.

In the socket 96 shown in Fig. 4, the pin 95 is adapted to be driven by the token or coin being transferred sufficiently to bring the indicator means 15 to position to indicate a full parking period of say sixty minutes through the sight windows 26 and 27. By placing the pin 95 in one of the other sockets 96, it will not be engaged by the token or coin until after the token or coin has traversed a greater arc during the transfer to the depositing guideway 67 and therefore the segmental gear will be driven through a lesser arc than when the pin is in the position shown in Fig. 4. That driving of the segmental gear through a lesser arc results in bringing the indicator means to a position to indicate a parking period less than the supposed sixty minutes. In that manner, the parking period indicated and timed may be adjusted to suit various traffic conditions.

It will be understood that after the parking meter has been set for timing and indicating a parking period, the clock 16 may drive the winding stem 41 and hence the chain of gears 42, 43, and 92 in the opposite direction from that caused by the operation of the handle 78. In order to limit the rotation of the segmental gear 92 during such driving thereof from the winding stem 41, and hence to determine accurately the position of the indicator means 15 when the clock 16 is stopped, the segmental gear 92 is provided with a lug 97 extending outwardly from its periphery for engagement with the lower end (Figs. 3 and 4) of a token or coin retaining member 98. If desired a pin or other projection 99 on the rear face of the mounting plate 34 may be employed for engagement by the lug 97 to limit the rotation of the segmental gear by the handle 78.

The token or coin retaining member 98 is preferably of angular cross-section. It is mounted on the rear face of the mounting plate 34 and has a rearwardly projecting wall 101 which extends arcuately about a portion of the wheel-like member 79 outwardly adjacent the flange 83 from a position adjacent the cam finger 75 to a position adjacent the depositing guideway 67. The cam finger 75 thus extends rearwardly to adjacent the forward face of the flange 83 and is operable by the token or coin just before the outer portion of the token's or coin's periphery is engaged by the wall 101 to retain the token or coin in the transferring device 63 while it is being transferred to the depositing guideway 67.

As already stated, until a token or coin is inserted in the aperture 31, the handle 78 is locked against rotation. When a token or coin is inserted in the aperture 31, it falls down the guideway 65 through the port 66 and the slot 89 aligned therewith, and comes to rest with the lower portion of its periphery in the corresponding recess 91. If the handle 78 is now rotated in the direction indicated by the arrow in Fig. 3, the upper portion of the periphery of the token or coin will act as a cam to engage the pin 62 and raise the shutter member 54, whereby to conceal the indicator means 15 from view through the sight windows 26 and 27, the periphery of the flange 83 retaining the pin 62 in that position during further rotation of the handle 78.

Thus the token or coin serves to release the wheel-like device 79 as well as to raise the shutter member 54. Being thus released, the wheel-like device 79 may be further rotated by the handle 78 and carries with it the token or coin which next engages the cam finger 75 to operate the token or coin trip lever 72, releasing the token or coin last used to control the parking meter and permitting it to fall through the depositing guideway 67 into the token or coin receptacle 24. Continued rotation of the handle moves the token or coin beyond the cam finger 75, whereupon the spring 74 restores the trip lever 72, and into engagement with the pin 95 in one of the sockets 96.

Further rotation of the handle 78 causes the token or coin to drive the pin 95 whereby to rotate the segmental gear 92 and hence the gears 43 and 42 for winding the clock 16 and setting the indicator means 15 at a position depending upon the socket 96 in which the pin 95 is located. The rotation of handle 78 is continued until it has been turned through 180 degrees. When that has been accomplished, the token or coin passes beyond the lower end of the retaining wall 101 and is aligned with the port 68 of the depositing guideway 67, whereupon the token or coin drops through that port into the depositing guideway and is stopped by the finger 73 in view between the apertures 69 through the sight windows 28 and 29.

At that position of the transferring device 63, the other slot 85 is in registration with the pin 62 which falls therein, thus lowering the shutter member 54 to expose the indicator means 15 through the sight windows 26 and 27 and locking the token or coin control means 17 against further rotation. When the token or coin falls into the depositing guideway 67, the segmental gear 92 is free to be rotated about the shaft 76. The self-starting clock 16, energized as already described, now rotates the shaft 39 and hence the indicator means 15 in accordance with the time indicia on the latter to indicate the duration of the parking period. That rotation is in the opposite direction from the direction described for setting the parking meter, and such rotation is transmitted through the stem 41 and the gears 42 and 43 to rotate the segmental gear 92 in the opposite direction until stopped by engagement of the lug 97 with the lower end of the retaining wall 101.

When the lug 97 engages the wall 101, the segmental gear is in its original position, the clock and hence the indicator means are stopped. Thus the clock in driving the indicator means resets the token or coin operated means for energizing the clock and resetting the indicator means. The foregoing cycle may be repeated as often as desired by inserting a token or coin in the aperture 31 and turning the handle 180 degrees in a clockwise direction as viewed in Fig. 1.

While we have illustrated and described a preferred embodiment of our invention, many modifications may be made without departing from the spirit of the invention, and we do not wish to be limited to the precise details set forth but desire to avail ourselves of all changes within the scope of the appended claims.

Having thus described our invention, what we claim as new and desire to secure by Letters Patent of the United States is:

1. A parking meter comprising an indicator, an operable shutter, timer means for driving said indicator, a casing enclosing said indicator, shutter, and timer means and having sight windows for exposing said indicator to view from opposite sides of said casing, and token or coin control means for setting said indicator and energizing said timer means and for operating said shutter to conceal said indicator while it is being set.

2. A parking meter comprising an indicator, timer means for driving said indicator, a rotatable member having driving connection with said indicator and said timer means and having an adjustable device for operating said member, driving means for said member having a token or coin receiving recess therein for receiving an actuating token or coin for said adjustable device, and token or coin released means releasably locking the last said means in an inoperative position.

3. A parking meter comprising timer means including a timer shaft and a winding stem, indicator means fixed on said shaft to rotate therewith, drivable means operatively connected with said winding stem, rotatable means including a token or coin receiver for moving a token or coin to drive said drivable means, and token or coin released means releasably locking said rotatable means against rotation.

4. A parking meter comprising indicating means for timing and indicating a parking period, a grace period and an overtime period, rotatable means operatively connected with said indicating means for energizing and setting the same, means comprising coin or token released mechanism for rotating said rotatable means, and a shutter for concealing said indicating means during the energization thereof, said shutter having means operatively connecting the same with said token or coin released means.

5. In a parking meter, indicating means for timing and indicating a parking period, token or coin control means for setting and energizing said indicating means, shutter means for said indicating means provided with a token or coin actuable member for releasably locking said token or coin control means against operation in one direction, and means for holding said token or coin control means against operation in the other direction.

6. A parking meter comprising a casing having a window, a parking indicator in said casing actuatable in visual relation with respect to said window, timing means in said casing for actuating said indicator, coin controlled mechanism operable from outside said casing for energizing said timer means and comprising adjustable means for predetermining the period of actuation of said indicator by said timing means, and means normally locking said mechanism against operation comprising a releasable member actuatable to releasing position by a mechanism controlling coin.

7. A coin controlled parking meter comprising a parking period indicator, drive means therefor, a manually operable rotatable member, mechanism operable by said member for setting said indicator in predetermined position at the beginning of a parking period and for energizing said drive means, said rotatable member having a coin receiving recess for transferring a coin from one position in the meter to another during the operation of said member, means for locking said member normally against operation and movable to unlocked position by a coin in said recess, and a member engageable by a coin during the transfer thereof by said rotatable member for effecting an operative connection between said rotatable member and said energizing mechanism.

8. A coin controlled parking meter comprising a variable parking period indicator, drive means therefor, a manually operable rotatable member, mechanism operable by said member for setting said indicator in predetermined position at the beginning of a parking period and for energizing said drive means, said rotatable member having a coin receiving recess for transferring a coin from one position in the meter to another during the operation of said member, means for locking said member normally against operation and movable to unlocked position by a coin in said recess, and a member engageable by a coin during the transfer thereof by said rotatable member for effecting an operative connection between said rotatable member and said energizing mechanism, said coin engageable member being adjustable along the transfer path of a coin for effecting a predetermined variation in the setting of said indicator.

9. A coin controlled parking meter comprising a parking period indicator, means for operating the indicator during a parking period, mechanism comprising an adjustable member for effecting the energization of said operating means and setting the indicator in position for indicating the beginning of a parking period, rotatable means for actuating said mechanism including a member for so carrying a coin as to cause the same to engage said adjustable member for effecting the actuation of the latter and said mechanism an extent predetermined by the adjustment of said adjustable member, and locking means for said rotatable means displaceable from locking position by a coin in said coin carrying member during the initial operation of said rotatable means.

10. A coin controlled parking meter having a parking period indicator, means for operating the indicator during a parking period, mechanism for setting said indicator in a predetermined position at the beginning of a parking period, manually operable means having a coin receiving recess for transferring a coin from one position in the meter to another during the operation of said means, releasable locking means adjacent said recess normally restricting operative movement of said manually operable means and being displaceable from locking position by a coin in said recess, and actuating means for said mechanism comprising a member disposed in the transfer path of said coin for actuation thereby.

DAVID C. ROCKOLA.
ALFRED VISCHER, Jr.